(12) United States Patent
Smith et al.

(10) Patent No.: US 8,635,743 B2
(45) Date of Patent: Jan. 28, 2014

(54) HINGE

(75) Inventors: Peter Smith, Leeds (GB); Chris Wilkinson, Huddersfield (GB)

(73) Assignee: Mamas and Papas Limited, Huddersfield (GB)

(*) Notice: Subject to any disclaimer, the term of this patent is extended or adjusted under 35 U.S.C. 154(b) by 0 days.

(21) Appl. No.: 13/225,715

(22) Filed: Sep. 6, 2011

(65) Prior Publication Data

US 2012/0060326 A1 Mar. 15, 2012

(30) Foreign Application Priority Data

Sep. 6, 2010 (GB) .................................. 1014777.5

(51) Int. Cl.
*E05D 11/00* (2006.01)
*B62B 7/06* (2006.01)
*B62B 7/00* (2006.01)

(52) U.S. Cl.
USPC .............................. 16/382; 280/642; 280/650

(58) Field of Classification Search
USPC ................... 16/438, 436, 900, 387, 324, 326;
403/119, 150, 157, 161; 182/163;
5/98.1, 99.1; 280/642, 647, 650
See application file for complete search history.

(56) References Cited

U.S. PATENT DOCUMENTS

| 3,187,373 | A | * | 6/1965 | Fisher | 16/324 |
|---|---|---|---|---|---|
| 4,286,353 | A | * | 9/1981 | Roche | 16/341 |
| 4,317,289 | A | * | 3/1982 | Conn | 33/498 |
| 4,478,427 | A | * | 10/1984 | Hyde et al. | 280/642 |
| 4,503,583 | A | * | 3/1985 | Frohbieter | 16/232 |
| 4,529,219 | A | * | 7/1985 | Shamie | 280/642 |
| 4,660,850 | A | * | 4/1987 | Nakao et al. | 280/642 |
| 4,756,053 | A | * | 7/1988 | Madden et al. | 16/223 |
| 4,787,731 | A | * | 11/1988 | Rogers | 351/153 |
| 4,805,737 | A | * | 2/1989 | Peng | 182/163 |
| 4,934,025 | A | * | 6/1990 | Mariol | 16/347 |
| 4,974,289 | A | * | 12/1990 | Piard | 16/228 |
| 5,026,198 | A | * | 6/1991 | Lin | 403/27 |
| 5,058,239 | A | * | 10/1991 | Lee | 16/324 |
| 5,087,066 | A | * | 2/1992 | Mong-Hsing | 280/644 |
| 5,143,398 | A | * | 9/1992 | Teng | 280/642 |

(Continued)

FOREIGN PATENT DOCUMENTS

EP 1749729 A1 * 2/2007

OTHER PUBLICATIONS

Emmanuel Marchand, EP 1749729 Machine Translation by Espacenet, Oct. 11, 2012.*

*Primary Examiner* — Victor Batson
*Assistant Examiner* — Jason W San
(74) *Attorney, Agent, or Firm* — Woodard Emhardt Moriarty McNett & Henry LLP (57) ABSTRACT

Disclosed is a hinge for a buggy, stroller, etc. for infants. The hinge includes a first hinge member and a second hinge member. Hinge member includes a first hinge end and a connecting end to connect to a first structural member of an infant support apparatus along a first axis. The second hinge member includes a hinge end and a connecting end to connect to structural member of the infant support apparatus along a second axis. The hinge members are pivotal about an axis between a bent condition wherein the first and second longitudinal axes are non-aligned and a straight condition wherein the first and second longitudinal axes are generally aligned. The hinge ends are configured such that the amount of the profiles which overlap prevent the formation of a finger trap.

18 Claims, 10 Drawing Sheets

(56) References Cited

U.S. PATENT DOCUMENTS

| | | | |
|---|---|---|---|
| 5,195,551 A * | 3/1993 | Ju | 135/126 |
| 5,370,396 A * | 12/1994 | Bloom | 473/232 |
| 5,380,113 A * | 1/1995 | Boehm | 403/102 |
| 5,381,570 A * | 1/1995 | Cheng | 5/99.1 |
| 5,460,398 A * | 10/1995 | Huang | 280/642 |
| 5,472,224 A * | 12/1995 | Jane Cabagnero | 280/642 |
| 5,500,981 A * | 3/1996 | Ho | 16/113.1 |
| 5,681,045 A * | 10/1997 | Liao | 273/400 |
| 5,704,725 A * | 1/1998 | Horing | 403/109.3 |
| 5,743,671 A * | 4/1998 | Williams | 403/316 |
| 5,823,564 A * | 10/1998 | Kettler | 280/642 |
| 5,845,924 A * | 12/1998 | Huang | 280/642 |
| 5,890,263 A * | 4/1999 | Wu | 16/324 |
| 5,940,935 A * | 8/1999 | Julius | 16/269 |
| 5,991,975 A * | 11/1999 | Baer | 16/354 |
| 6,014,781 A * | 1/2000 | Cone, II | 5/99.1 |
| 6,073,945 A * | 6/2000 | Cheng | 280/47.36 |
| 6,101,678 A * | 8/2000 | Malloy et al. | 16/438 |
| 6,168,345 B1 * | 1/2001 | Legge | 403/385 |
| 6,343,406 B1 * | 2/2002 | Yeh | 16/328 |
| 6,371,873 B1 * | 4/2002 | Wang | 473/478 |
| 6,422,586 B1 * | 7/2002 | Glover | 280/647 |
| 6,422,587 B1 * | 7/2002 | Yamazaki et al. | 280/647 |
| 6,434,768 B2 * | 8/2002 | Brown et al. | 5/99.1 |
| 6,478,328 B1 * | 11/2002 | Yeh et al. | 280/650 |
| 6,485,216 B1 * | 11/2002 | Cheng | 403/102 |
| 6,499,750 B1 * | 12/2002 | Michelau | 280/87.01 |
| 6,523,853 B1 * | 2/2003 | Cheng | 280/642 |
| 6,842,923 B1 * | 1/2005 | Castellani et al. | 5/627 |
| 6,921,102 B2 * | 7/2005 | Hsia | 280/642 |
| 7,003,849 B2 * | 2/2006 | Cohen et al. | 16/232 |
| 7,007,968 B2 * | 3/2006 | Yamazaki et al. | 280/647 |
| 7,131,166 B2 * | 11/2006 | Cohen et al. | 16/232 |
| 7,246,813 B2 * | 7/2007 | Yamazaki et al. | 280/650 |
| 7,827,655 B2 * | 11/2010 | Yi | 16/261 |
| 7,938,291 B2 * | 5/2011 | Christensen | 220/666 |
| 7,942,159 B2 * | 5/2011 | Choi | 135/120.3 |
| 8,006,345 B1 * | 8/2011 | Bryce | 16/285 |
| 8,226,110 B2 * | 7/2012 | Liao | 280/642 |
| 8,226,111 B2 * | 7/2012 | Valdez et al. | 280/647 |
| 2009/0133224 A1 * | 5/2009 | Hanigan | 16/382 |
| 2011/0142533 A1 * | 6/2011 | Liu et al. | 403/119 |
| 2012/0032419 A1 * | 2/2012 | Li | 280/647 |
| 2012/0110785 A1 * | 5/2012 | Hanigan | 16/367 |
| 2012/0183345 A1 * | 7/2012 | Lin | 403/23 |
| 2012/0240381 A1 * | 9/2012 | Carey | 29/525.01 |
| 2012/0242062 A1 * | 9/2012 | Schroeder et al. | 280/650 |

* cited by examiner

HINGE

CROSS-REFERENCE TO RELATED APPLICATION

This application claims the foreign priority benefit of Great Britain Patent Application No. GB 1014777.5 filed Sep. 6, 2010, which is hereby incorporated by reference.

BACKGROUND

The present invention relates to a hinge of an infant support apparatus, and to infant support equipment, or apparatus, such as a stroller, buggy or high chair, for example, includes a hinge.

Strollers and buggies and other infant equipment are generally provided with a frame or other structural components which are joined together by a hinge to allow the equipment to be collapsed to a folded condition and expanded to an unfolded, or operative, condition.

It is often desirable to enable connecting structural members of the apparatus to pivot through more than 90 degrees about a pivotal axis of a hinge and preferably close to 180 degrees, so that the apparatus can be fully collapsed to occupy a minimal amount of space.

There is a requirement to provide a hinge which prevents the trapping of fingers in the hinge mechanism. It will be appreciated that due to lever action, the forces generated by a person collapsing and unfolding an apparatus are greatly increased at or close to the hinge and therefore severe injury may occur, particularly to fingers.

Typically, more dangerous hinges comprise two hinge members which can be pivoted between a straight condition and a bent condition, such that during pivoting in one direction an opening is formed between the hinge members which is subsequently closed during pivoting in an opposing direction causing trapping of fingers and injury. It is an object of the present invention to provide a hinge which reduces the risk and ideally does not cause such an injury.

A number of earlier hinges will now be described in more detail to aid understanding of the improvements made by the present invention.

Figure 7:
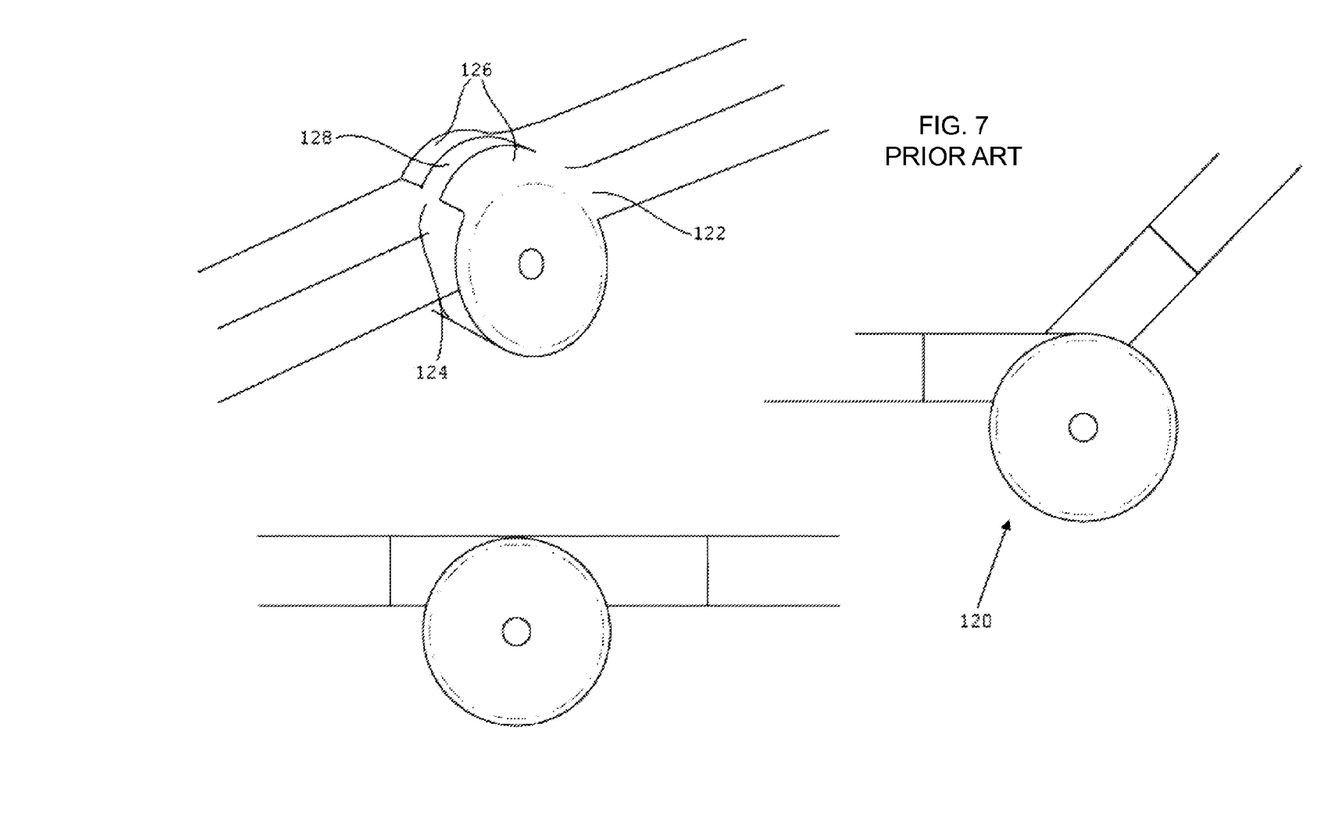
FIG. 7 shows a first prior art hinge.

FIG. 7 shows a prior art hinge 120 connecting two structural members of an infant support apparatus. The hinge is configured so that the structural members are aligned when the hinge is in a straight condition. That is, the longitudinal axes of the support members are generally aligned when the hinge is straight and the structural members are positioned on opposite sides of the hinge. A hinge which aligns structural members in this way is referred to as an in-line hinge.

The hinge comprises two hinge members 122, 124 which together form a barrel shaped hinge having two generally circular parts which rotate relative to each other. Circular parts 126 of one hinge member 122 are located on both sides of a circular part 128 of the other hinge member 124. The circular parts are free to move relative to each other to allow pivotal movement. The circular configuration of the relatively moveable parts prevents the formation of a pinch point, or finger trap, since a gap does not open between the hinge members during pivotal movement. However, in order to allow the structural members to be pivotal through 180 degrees, the pivot axis must be off-set sufficiently from the longitudinal axes of the structural members, otherwise the structural members contact each other prior to pivotal movement through 180 degrees e.g. at about 150 degrees or less.

Accordingly, the requirements of the hinge shown in FIG. 7 is that the hinge ends are both circular to prevent trapping and that the pivot axis is off set. As will be seen, satisfying both of these requirements results in a relatively large and bulbous hinge.

Figure 8:
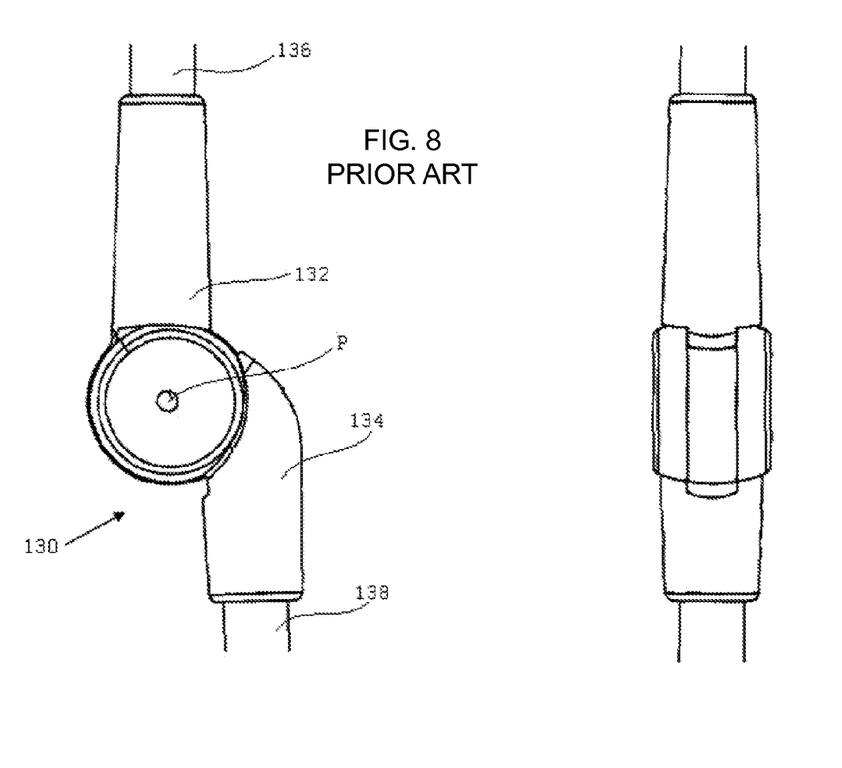
FIG. 8 shows a second prior art hinge.

Another prior art hinge 130 is shown in FIG. 8, which also comprises barrel shaped hinge members 132, 134 but in this arrangement even though the pivotal axis P is aligned with the longitudinal axis of one structural member 136, in order to allow pivotal movement through 180 degrees the structural members 136, 138 are off-set from one another. Therefore, a pinch point is avoided in this example because of the barrel configuration and the hinge appears slightly less bulbous, but the design results in an off-set hinge, which may cause some bending or shear when the longitudinal forces applied to the hinge are resolved.

In this arrangement, pivotal movement beyond the straight condition of the hinge is prevented by contact between the hinge member 134 and the hinge member 132 on the outside of the hinge.

Figure 9:
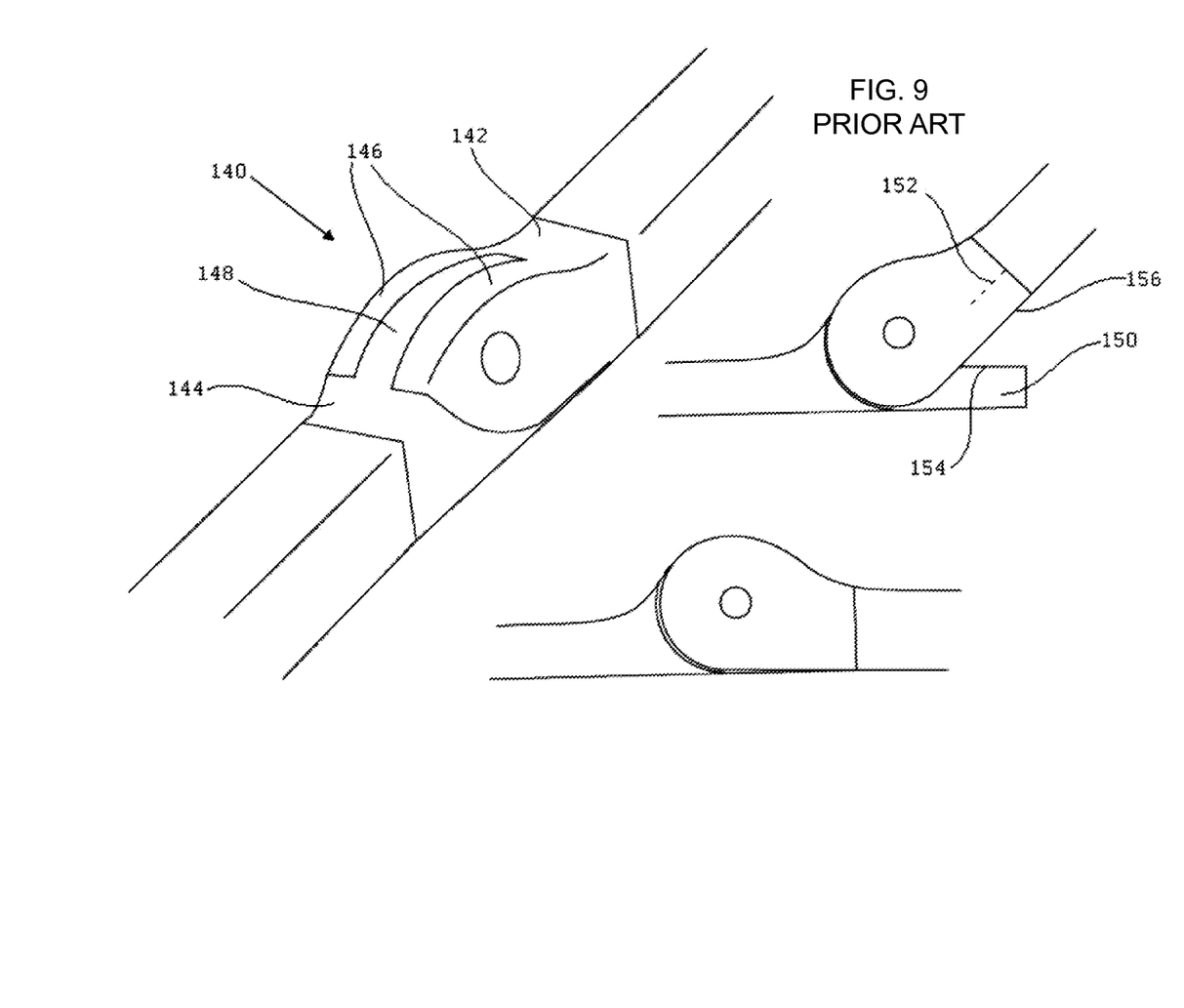
FIG. 9 shows a third prior art hinge.

FIG. 9 shows another prior art hinge 140, which is designed to prevent over-rotation of the hinge beyond a straight condition, although in the configuration shown, the hinge cannot pivot through more than about 120-150 degrees.

The hinge 140 comprises hinge members 142, 144 having complementary circular parts 146, 148 which can slide relative to each other to allow pivotal movement. The part 148 has a longitudinal extension 150 which is adapted to abut against a surface 152 of part 148 to prevent pivotal movement beyond the straight condition. However, if a finger were to be accidentally located between external surfaces 154, 156 when the hinge is closed, injury would be incurred because of the lever action which magnifies the closing force.

SUMMARY

According to the present invention, based on the exemplary embodiments which are disclosed, there is provided a hinge which includes a first hinge member having a hinge end and a connecting end extending from the hinge end to connect to a first longitudinal structural member of an infant support apparatus along a first longitudinal axis. Further included is a second hinge member having a hinge end and a connecting end extending from the hinge end to connect to a second longitudinal structural member of the infant support apparatus along a second longitudinal axis. Also included is a pivot member extending through the hinge ends transverse to the first and second longitudinal axes and defining a pivot axis disposed in a pivot axis plane. The hinge members are pivotal about the pivot axis between a first condition in which the first and the second longitudinal axes are non-aligned and disposed to one side of the pivot axis plane and a second condition in which the first and second longitudinal axes are generally aligned and the connecting ends are disposed on opposite sides of the pivot axis plane. A profile of the first hinge end includes a plurality of first profile portions and a profile of the second hinge end includes a plurality of second profile portions which are arranged alternately with the first profile portions in the transverse direction. The first and second profile portions are disposed in partially lapping relationship when in the first condition and configured such that pivotal movement from the first condition to the second condition increases the amount of the profile portions which overlap and at least one first profile portion moves within adjacent second profile portions and at least one second profile portion moves within adjacent first profile portions to prevent formation of a finger trap between the hinge ends.

The present invention further provides a child support apparatus which includes at least one such hinge.

BRIEF DESCRIPTION OF THE DRAWINGS

In order that the invention may be more clearly understood, reference will now be made to the accompanying drawings, given by way of example only, in which.

DESCRIPTION OF THE SELECTED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Referring to FIGS. 1 to 4, a hinge 10 is shown which comprises a first hinge member 12 and a second hinge member 14. The first hinge member 12 comprises a first hinge end 16 and a connecting end 18 extending from the hinge end to connect to a first longitudinal structural member 20 of an infant support apparatus (not shown in FIG. 1) along a first longitudinal axis L1. The second hinge member 14 comprises a complementary configured hinge end 22 and a connecting end 24 extending from the hinge end to connect to a second longitudinal structural member 26 of the infant support apparatus along a second longitudinal axis L2.

A pivot member 28 extends through apertures 29, 31 in respective hinge ends 16, 22 transverse to the first and second longitudinal axes L1, L2 and defines a pivotal axis T1, which is transverse to the longitudinal axes and disposed in a pivot axis plane P2.

The hinge members 12, 14 are pivotal about the pivot axis T1 between a first condition (shown in FIG. 2) in which the first and the second longitudinal axes L1, L2 are non-aligned and disposed to one side of the pivot axis plane P2 and a second condition (shown in FIG. 1) in which the first and second longitudinal axes are generally aligned and the connecting ends 18, 24 are disposed on opposite sides of the pivot axis plane P2.

In a child support apparatus, such as buggy, pram or stroller, or collapsible bed, carrier, or seat, it is desirable to collapse the apparatus into a folded condition for storage or transport or open-out the apparatus to an operative, or usable, condition. In such an arrangement, hinge 10 connects to two structural members of the apparatus to allow collapsing and opening of the apparatus.

Figure 1:
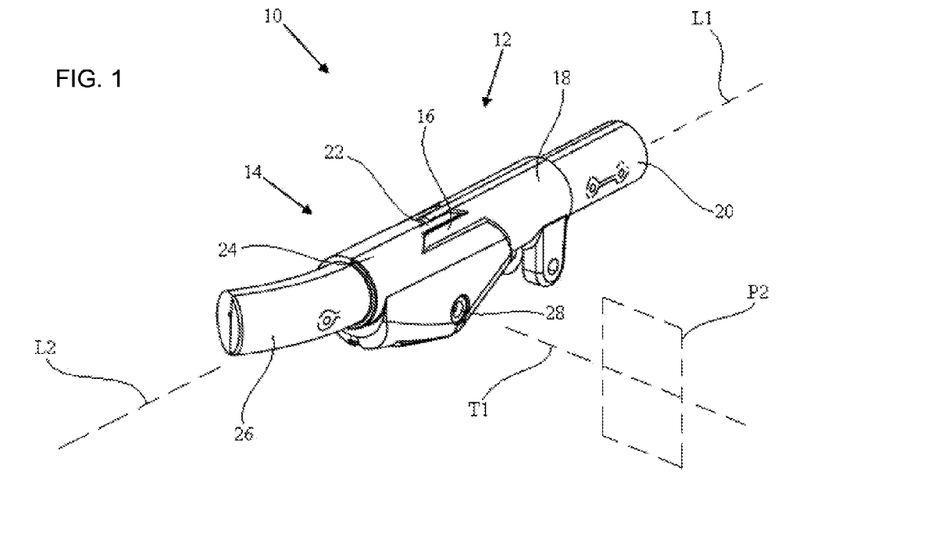
FIG. 1 shows a first hinge in a straight condition according to a disclosed embodiment.
Figure 1A:
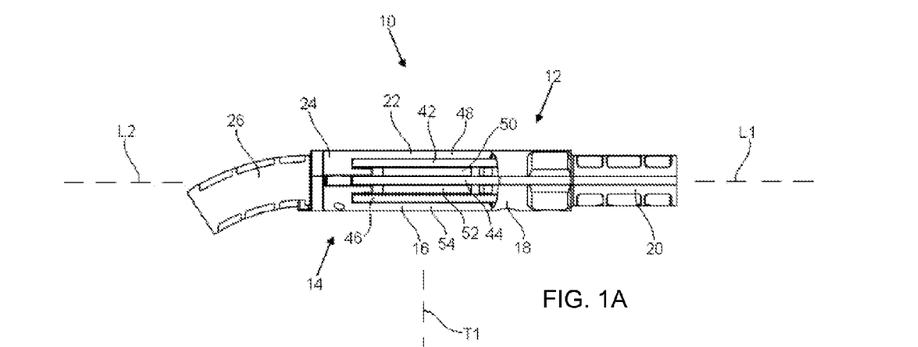
FIG. 1A shows a bottom plan view of the hinge in the straight condition.
Figure 2:
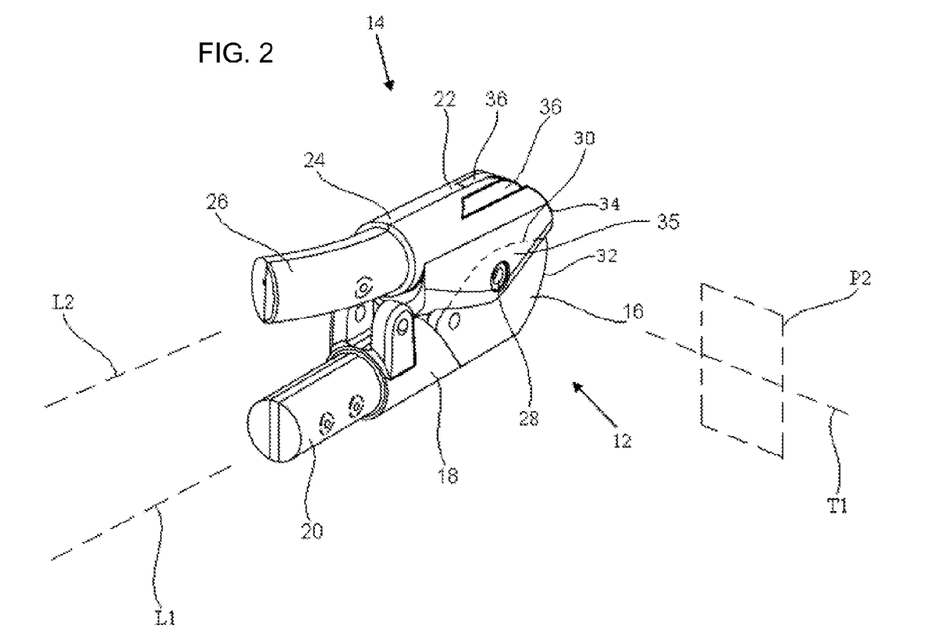
FIG. 2 shows the first hinge in a fully bent condition.
Figure 2A:
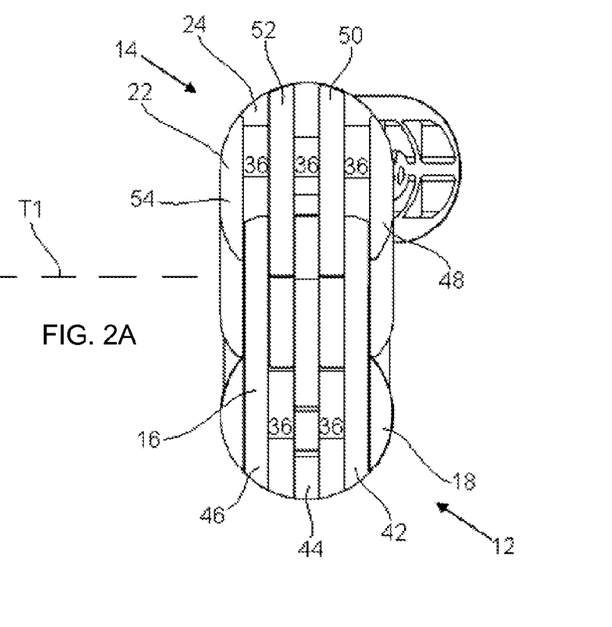
FIG. 2A shows an end view of the hinge in the fully bent condition.
Figure 3:
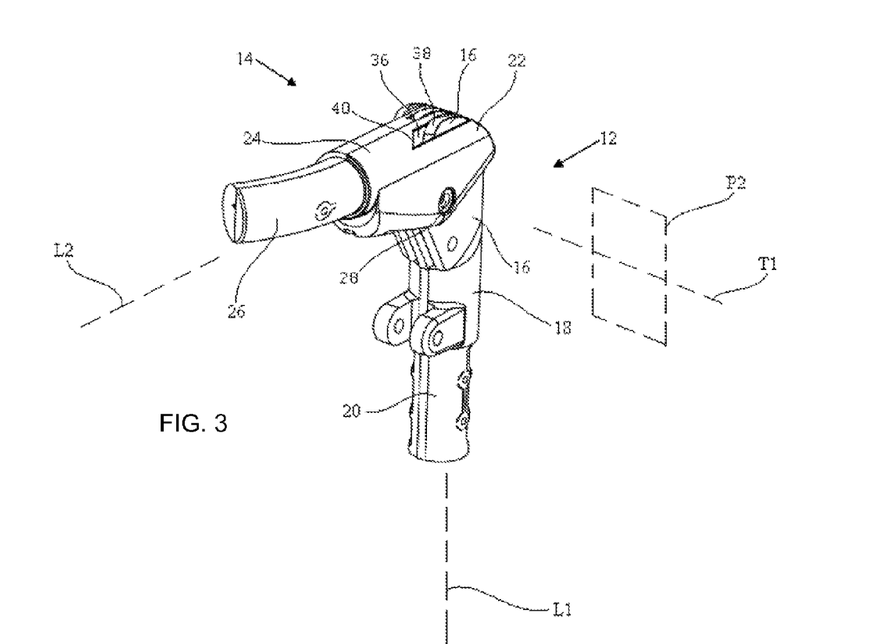
FIG. 3 shows the first hinge in an intermediate condition.
Figure 3A:
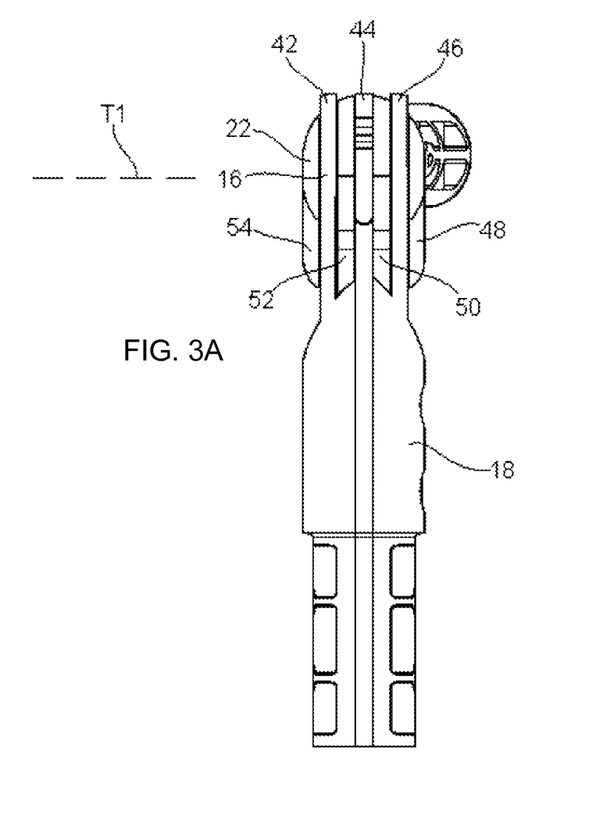
FIG. 3A shows an end view of the hinge in the intermediate condition.

The hinge ends 16, 22 have respective profiles 32, 34 which are disposed in partially lapping relationship when in the first condition shown in FIG. 2, in which the broken line 30 shows the hidden part of profile 32 and the partially lapping region 35. The term profile as used herein means the profile as viewed generally in the transverse direction T1. The present example comprises multiple profile portions 32, 34. Profile portion 32 comprises portions 42, 44, 46 and profile portion comprises portions 48, 50, 54. The hinge ends are configured such that pivotal movement from the first, fully folded, condition to the second, straight or aligned, condition (shown in FIG. 1) increases the amount of the profiles which overlap. In an intermediate condition, the hinge members are angularly displaced between about 180 degrees as shown in FIG. 2 and about 0 degrees as shown in FIG. 1 (at about 90 degrees in FIG. 3). In FIG. 3, profiles 32, 34 overlap to a greater extent than in FIG. 2 but to a lesser extent than as shown in FIG. 1.

In the straight condition, the profiles of the hinge ends are generally coincident in the sense that the outer perimeter of the hinge ends are generally contiguous, or proximate each other, when viewed in the transverse direction. In this way, the hinge ends present a smooth generally continuous surface which improves appearance. The profiles may not be entirely coincident in the straight condition and there may be some portions of one or other of the profiles which are not in lapping relationship so that one part projects out from another part, although this is currently not preferred as it would detract from the hinge's appearance.

In a hinge arrangement in which an angular displacement between hinge members of more than 90 degrees is required and preferably about 180 degrees is required, in order also to prevent the formation of a finger trap, known hinges either adopt an off-line relationship or require a large hinge which has a rather bulbous and unattractive appearance. It will be appreciated that the present arrangement allows a reduction in size of an in-line hinge which is pivotal through 180 degrees because the hinge members are designed to partially overlap when the hinge is bent and more fully overlap when the hinge is straight. This allows the pivot axis to be off-set without increasing hinge size. Inevitably though this arrangement exposes an opening when the hinge members are pivoted (from a fully overlapping relationship to a partially overlapping relationship) and it is important that such an opening does not form a finger trap. For example, openings 36 are shown in FIGS. 2 and 3 where the hinge is an intermediate condition.

As will be described in more detail below, the present invention avoids the formation of a finger trap because the opening or openings generated during use of the hinge are too small to allow insertion of a finger. Additionally though, the hinge end 16 has an arcuate end face 38 as shown in FIG. 3 which co-operates with a generally straight sided end face 40 of hinge end 22 to reduce a pinching force. The curved face 38 will also tend to push objects out of an opening rather than gather them into an opening.

As shown particularly in FIG. 1, the hinge ends 16, 22 are each asymmetric about the pivot axis T1 having a significant portion on one side of the pivot axis and a smaller portion on the other side of the pivot axis. When straight, the hinge ends are both positioned above the pivot axis as shown in FIG. 1 achieving a reduction in size because the hinge as a whole is asymmetric about the pivot axis. When fully bent the hinge ends are diametrically opposed (one below and one above the pivot axis as shown in FIG. 2) and therefore the hinge as a whole is generally symmetric. In the fully bent condition, the hinge is relatively large, but because the hinge is fully bent when the infant support apparatus is not in use, size is not an important issue particularly as the infant apparatus will often be out of sight.

The profile of one of the hinge ends moves within the profile of the other of the hinge end during pivotal movement of the hinge members. As shown in FIGS. 1 to 4 and particularly FIG. 4, the profile of the first the hinge end 16 comprises at least one generally planar profile portion which is located between respective generally planar profile portions of the profile of the second the hinge end. In this embodiment, the first hinge end 16 comprises three profile portions 42, 44, 46. Profile portion 44 may optionally be made from a metallic material for strength. The second hinge end comprises four profile portions 48, 50, 52, 54. Profile portions 50, 52 in this example are made from a metallic material and are over moulded on respective profile portions 48, 54 which are made from a plastics material. The planar portions 42 to 54 partially overlap when the hinge is bent and straightening the hinge increases the amount of overlapping. The profile portions 42, 44, 46, 50, 52 interlock such that one profile portion fits between two adjacent profile portions of the opposing hinge end.

Figure 4:
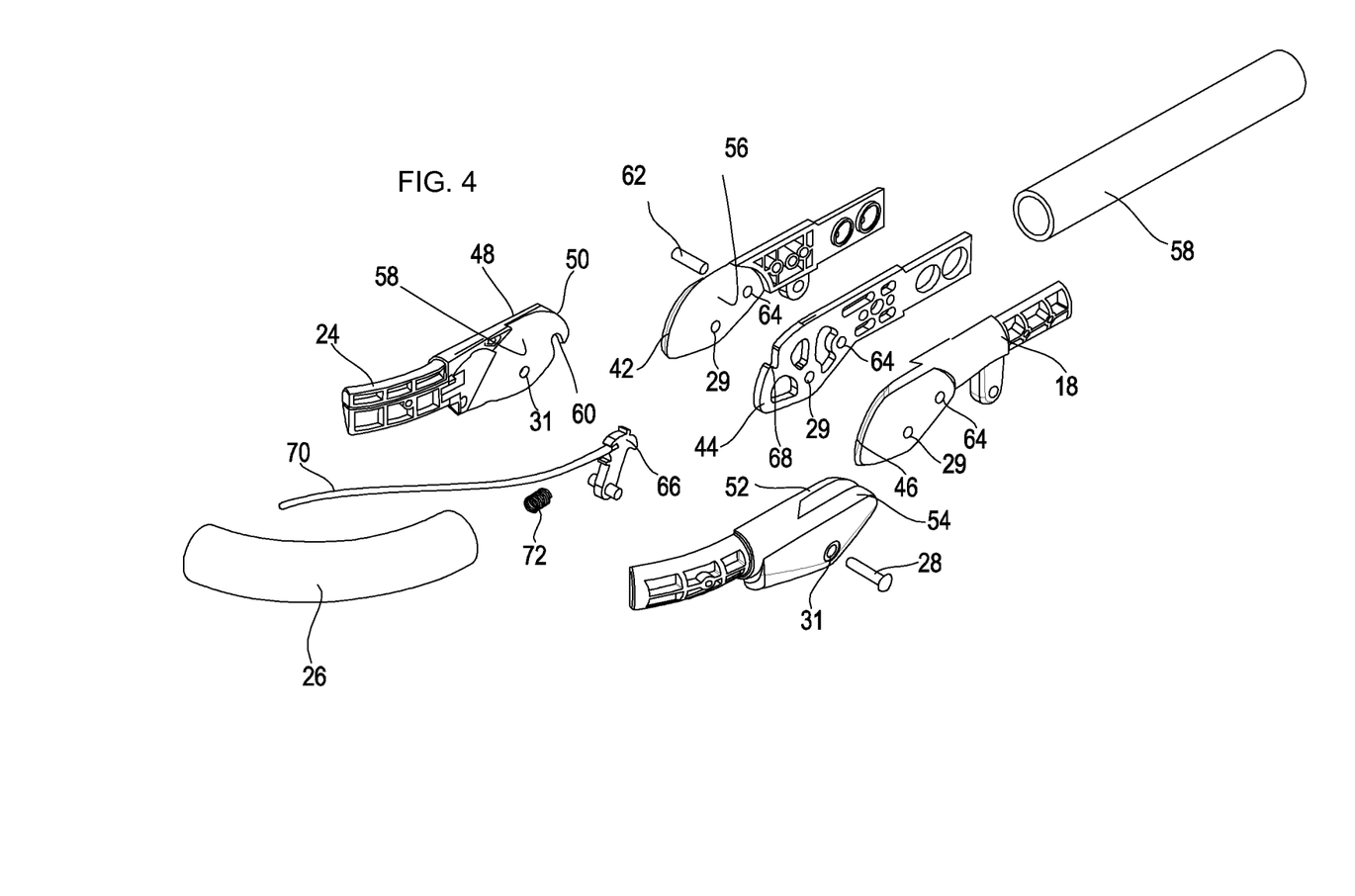
FIG. 4 is an exploded view of the first hinge.

The profile portions 48, 54 at the transverse ends of the hinge fit against only one adjacent profile portion of the opposing hinge. The arrangement therefore provides a laminated structure having alternate profile portions from each of the two hinge ends. Whilst each of the profile portions is relatively thin in the transverse direction, the strength of the hinge is generally cumulative of the strength of the individual interlocking profile portions. With this arrangement, the transverse width of the profile portions can be reduced to prevent the formation of a finger trap between the profile portions of one hinge member when the hinge is pivoted out of the straight condition.

In the embodiments, the profile portions have at least one generally planar surface which faces in the transverse direction and is configured to sit flush with a generally planar surface of an adjacent profile portion of an opposing hinge end. Two such surfaces 56, 58 are labelled in FIG. 4. Each of the outer profile portions 40, 54 have one planar surface and each of the sandwiched profile portions 42, 44, 46, 50, 52 has two such planar surfaces. The flush fitting of the planar surfaces at least in the straight or substantially straight condition provides distribution of loading on the hinge and reduces the occurrence of load points in the hinge which may be a source of weakening. The planar surfaces slide against one other during pivotal movement of the hinge thereby guiding pivotal movement, and when in the straight condition resist bending, shear and torsion on the hinge.

The multiple planar portions greatly increase the choice of materials used for making the hinge. Whilst a metallic material may be used, providing additional strength, metallic materials are generally heavier than plastics or at least more expensive. In the absence of the laminated structure of the hinge, if it were desired to make the hinge from a plastics material which is generally less resistant to loading than a metallic material, then the hinge ends would have to be made relatively thick in the transverse direction to resist loading. Such a required thickness would produce an opening between hinge ends when the hinge is bent which could form a finger trap when the hinge is straightened. According to current international standards, a finger trap is formed by an opening of 5 mm or more, when an infant support apparatus is in an operative condition. An opening of less than 5 mm does not in typical operating conditions allow the insertion of a child's finger, which is usually tested with a 5 mm probe. International standards which currently refer to a 5 mm opening are inter alia: EN1888, ASTM F833, ASNZ 2088, SOR 85379, EN 14988, ASTM F404, EN12790, and ASTM F2167-10, which relate to a number of different infant support apparatus.

Accordingly, in the embodiment of FIGS. 1 to 4, the transverse width of profile portions 42, 44, 46, 50, 52 is less than 5 mm so that the opening 36 formed between profile portions when the hinge is bent does not form a finger trap. The transverse end profile portions 48, 54 may be thicker if desired without forming a pinch point in the present configuration. In a typical infant support apparatus, such as a buggy, a hinge may be about any suitable size in the transverse direction e.g. 20 mm. Accordingly, if the profile portions shown in FIG. 4 are the same width, they will each be just less than 3 mm in width because there are seven profile portions in total.

The number of profile portions is selected according to the required transverse width of hinge so that an opening formed between profile portions does not exceed 5 mm. Moreover, as 5 mm is currently considered to be the boundary limit for formation of a finger trap, it is preferable to select the number of profile portions so that the width of an opening formed between profile portions is close to but does not exceed 5 mm.

If a larger hinge is required, for example, one that is 70 mm in width, more profile portions may be provided at the hinge ends to maintain a small width between profile portions and prevent the formation of a finger trap. Regardless of the nominal finger size selected by the designer, the hinge can be configured to avoid finger trapping.

A hinge of a child support apparatus such as a buggy experiences loading when in an operative and unfolded condition of the apparatus and to a lesser extent in a folded condition. Loading of the hinge may be longitudinal, transverse, shear, bending or torsion. The hinge is required to have sufficient strength to resist such loading. The in-line arrangement of the hinge is suited for resisting longitudinal loading since the resolved longitudinally applied forces tend to generate bending or shear to a lesser extent than off-set hinges.

As shown in FIG. 4, the structure of each of the hinge members 12, 14 may be formed from separate components which are fixed together during manufacture by fastening pivotal member 28, thereby allowing separate components to be formed from different materials. For example, the components forming profile portions 44, 50 may be metallic, such as steel, to provide the hinge with greater strength particularly along the longitudinal axes, whereas the remainder of the components may be made from a plastics material to decrease mass or improve appearance. Alternatively, the hinge members may each be moulded in one or more pieces.

Referring to FIG. 4, the hinge 10 comprises a first arrangement which prevents the hinge from over-rotation past the straight condition to adopt a negative angle. In this regard, a positive angle is an angle between the straight and bent conditions shown in FIGS. 1 and 2. Over-rotation is undesirable because in an unfolded condition of an infant support apparatus, the hinge is required to be straight aligning structural members on either side of the hinge. The hinge also comprises a second arrangement which allows the hinge to be locked in the straight condition to prevent bending. The first and second arrangements therefore maintain the hinge in the straight condition for use in an unfolded infant support apparatus.

Accordingly, in another aspect of the present invention, there is provided a hinge which includes a first hinge member having a hinge end and a connecting end extending from the hinge end to connect to a first longitudinal structural member of an infant support apparatus along a first longitudinal axis. Also included is a second hinge member which includes a hinge end and a connecting end extending from the hinge end to connect to a second longitudinal structural member of the infant support apparatus along a second longitudinal axis. Further included is a pivot member extending through the hinge ends transverse to the first and second longitudinal axes and defining a pivot axis disposed in a pivot axis plane. The hinge members are pivotal about the pivot axis between a first condition in which the first and the second longitudinal axes are non-aligned and disposed to one side of the pivot axis plane and a second condition in which the first and second longitudinal axes are generally aligned and the connecting ends are disposed on opposite sides of the pivot axis plane. The hinge ends include respective stop portions which abut against each other in the first condition to stop pivotal movement in the first pivotal direction. Further, the hinge ends have an outer configuration which prevents finger trapping between the stop portions when the hinge members are pivoted in the first pivotal direction from the first condition to the second condition.

In the first arrangement, the hinge ends 16, 22 include respective stop portions 60, 62 which abut against each other in the first condition to stop pivotal movement in the first pivotal direction from the first condition to the second condition. In the example shown in FIG. 4, stop portion 60 of hinge end 22 includes hooks which are located on profile portions 50 and 52, the latter of which is not shown in the drawings. Therefore, a first stop portion is formed by a first profile portion of the hinge end 22 and a second stop portion is formed between the second profile portions. As shown, the first and second hinge ends both include multiple interlocking profile portions and therefore more than one stop portion can be provided on each hinge end to increase the resistance to over-rotation. The profile portions on which the stop portions are provided are preferably made from a metallic material to increase strength and to provide a hard surface resistant to deformation, should a large bending moment be applied to the hinge. It will also be seen that the stop portions are not located on the profile portions located at the transverse ends of the hinge so that they are contained within the body of the hinge to prevent fingers being trapped between the stop portions when the hinge is closed.

Stop portion 62 of hinge end 16 includes a bar. When assembled the bar is inserted through holes 64 in hinge end 22 and held in position. The hooks 60 abut against the bar 62 in the straight condition of the hinge preventing pivotal movement in the first direction beyond a straight orientation. The provision of hooks also allows resistance to loading in a direction which pulls the hinge members apart in the longitudinal direction.

The profile of the hinge ends has a radial outer configuration which also prevents finger trapping between the stop portions 60, 62 when the hinge members are pivoted in the first pivotal direction from the first condition to the second condition to prevent trapping between the stop portions.

In the second arrangement, the hinge end 22 includes a hook 66 which is pivotally mounted to the hinge end by a pin (not shown) which is configured to engage with a detent 68 on hinge end 16 when the hinge is pivoted in the first direction to the straight condition thereby preventing movement in a second, opposite, pivotal direction. A biasing structure, which in this example is a helical spring 72, biases the hook 66 into engagement with the detent 68. The hook 66 is connected to a cable 70 which is operable to disengage the hook 66 from the detent 68 to allow pivotal movement in the second direction. The cable 70 may pass through the structural member 26 to a manually operable handle mounted conveniently on the infant support apparatus so that when the apparatus is in an unfolded condition a user can remotely disengage the locking mechanism to allow the apparatus to be collapsed.

The locking mechanism 66, 68 is located within the hinge so that the outer profile of the hinge ends prevents accidental access by users.

The connecting ends 18, 26 of the hinge members can be configured in any suitable manner for connection to the structural members of the infant support apparatus, for example by fasteners, such as rivets, or adhesive, or by press fitting. The connection should be sufficient to resistant typical loads which are encountered during use of the infant support apparatus.

Figure 5:
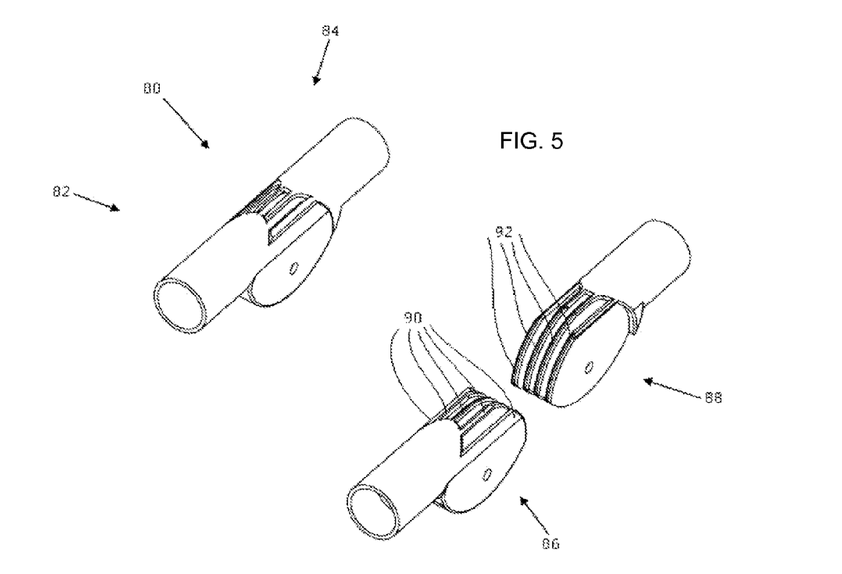
FIG. 5 shows a simplified view of a second hinge when assembled and when disassembled according to a disclosed embodiment.

A further hinge 80 is shown in FIG. 5. The hinge 80 includes a first hinge member 82 and a second hinge member 84. The first hinge member 82 includes a first hinge end 86 and connecting end 18 which is similar to that shown in FIGS. 1 to 4. The second hinge member 14 includes a complementary configured hinge end 88 and a connecting end 24 similar to that shown in FIGS. 1 to 4. The structural members are not shown in the Figure. A pivot member 28 (not shown) extends through the hinge ends 86, 88 to allow pivotal movement of the hinge.

In this example, hinge end 82 comprises five profile portions 90 which interlock with four profile portions of hinge end 84 making a total of nine profile portions in the laminate structure. This arrangement provides a greater number of interlocking profile portions for example for a larger hinge. Other aspects of this embodiment are similar to those described above with reference to the first embodiment.

Figure 6:
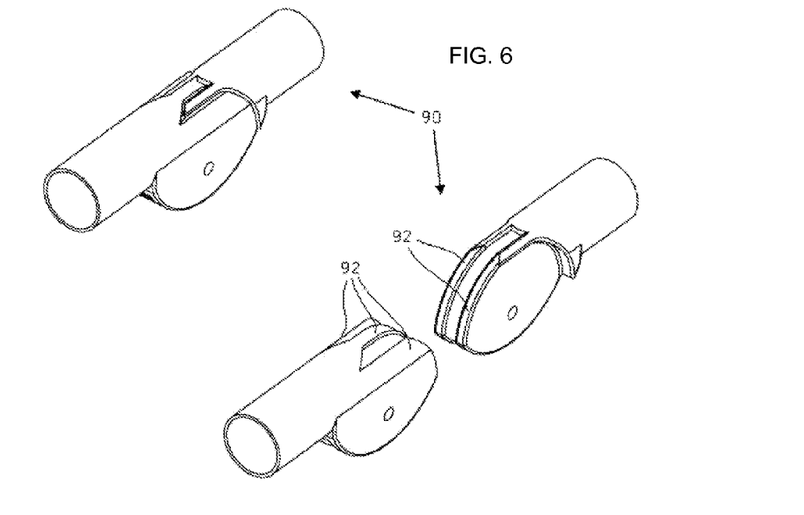
FIG. 6 shows a simplified view of a third hinge when assembled and when disassembled according to a disclosed embodiment.

A further embodiment of similar configuration is shown in FIG. 6, which shows a hinge 90 having five interlocking profile portions 92. This hinge 90 has fewer profile portions and may be more suitable for smaller hinges.

Figure 10:
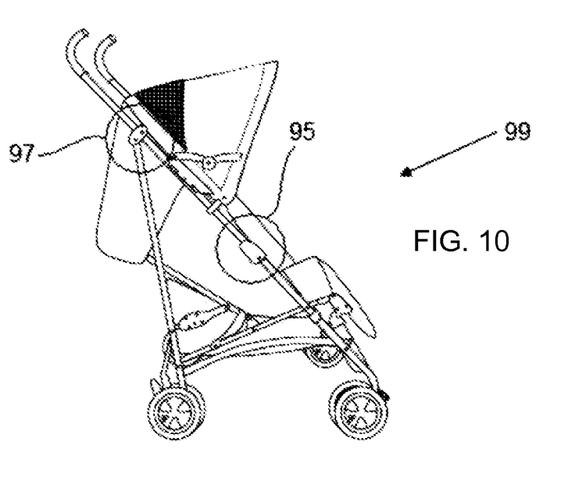
FIG. 10 shows an infant support apparatus which includes a hinge embodying the invention.

FIG. 10 shows an infant support apparatus 99 includes a hinge embodying the present invention which is shown schematically. In FIG. 10 two such hinges 97, 95 are shown (with similar hinges on the left hand side of the apparatus), although the apparatus may include one or more hinges. The apparatus in FIG. 10 is a buggy, but other apparatus such as prams, strollers, carry cots, or high chairs may include the inventive hinge.

The invention has been described above with respect to some preferred embodiments. It will be understood by those skilled in the art that changes and modifications may be made thereto without departing from the scope of the invention as set out in the appended claims.

The invention claimed is:
1. A hinge comprising:
   a first hinge member comprising a first hinge end and a first connecting end extending from said first hinge end, the first connecting end for connection to a first longitudinal structural member of an infant support apparatus along a first longitudinal axis;
   a second hinge member comprising a second hinge end and a second connecting end extending from said second hinge end, the second connecting end for connection to a second longitudinal structural member of said infant support apparatus along a second longitudinal axis;

a pivot member extending through said both hinge ends transverse to said first and second longitudinal axes and defining a pivot axis disposed in a pivot axis plane;

wherein said hinge members are pivotal about said pivot axis between a first condition in which said first and the second longitudinal axes are non-aligned and disposed to one side of said pivot axis plane and a second condition in which said first and second longitudinal axes are generally aligned and said connecting ends are disposed on opposite sides of said pivot axis plane; and wherein the first said hinge end comprises a plurality of first hinge end portions and the second hinge end comprises a plurality of second hinge end portions which are arranged alternately with the first hinge end portions in the transverse direction, the profiles of the first and second hinge end portions being disposed in partially lapping relationship when in said first condition and configured such that pivotal movement from said first condition to said second condition increases the amount by which the profiles of said first and second hinge end portions overlap and so that the outer profile of the hinge is continuous about the pivot axis in the first and second conditions sufficient to prevent the formation of a finger trap between said hinge ends in one dimension of the hinge and at least one first hinge end portion moves within adjacent second hinge end portions and at least one second hinge end portion moves within adjacent first hinge end portions to prevent formation of a finger trap between said hinge ends in a second dimension of the hinge.

2. A hinge as claimed in claim 1, wherein the second hinge end portions are disposed at the ends of the hinge in the transverse direction so that each first hinge end portion moves within adjacent second hinge end portions.

3. A hinge as claimed in claim 1, wherein each said hinge end is asymmetric about the pivot axis and the hinge ends are generally diametrically opposed in the first condition and generally contiguous in the second condition.

4. A hinge as claimed in claim 1, wherein adjacent first and second hinge end portions have respective planar surfaces which slide against each other during pivotal movement thereby providing support against loading on the hinge.

5. A hinge as claimed in claim 4, wherein mutually opposing planar surfaces at least partially overlap in the first condition thereby providing support against loading when the hinge ends are non-aligned.

6. A hinge as claimed in claim 5, wherein overlapping between mutually opposing planar surfaces increases when in the second condition thereby providing increased support against loading when the hinge ends are aligned.

7. A hinge as claimed in claim 1, wherein the hinge end portions between the end profile portions have a width in the transverse direction of less than 5 mm.

8. A hinge as claimed in claim 1, comprising a locking mechanism for locking the hinge in the second condition.

9. A hinge as claimed in claim 8, wherein said locking mechanism is spaced inwardly from an outer surface of the profile of the hinge members to prevent finger trapping.

10. A hinge as claimed in claim 8, wherein said locking mechanism comprises a hook pivotally mounted relative to the first hinge end and a detent located in the second hinge end, wherein the hook engages with the detent to lock the hinge.

11. A hinge as claimed in claim 10, wherein a cable extends from the hook to a handle which allows the hook to be released from the detent remote from the hinge.

12. A hinge as claimed in claim 1, wherein the hinge ends comprise respective stop portions which abut against each other in the first condition to stop pivotal movement in the first pivotal direction; and wherein the profile of the hinge ends have an outer configuration which prevents finger trapping between said stop portions when said hinge members are pivoted in the first pivotal direction from said first condition to the second condition.

13. A hinge as claimed in claim 12, wherein the profile of the first said hinge end comprises one of said first hinge end portions located between two second hinge end portions of the profile of the second hinge end such that the first and second hinge end portions are provided alternately in the transverse direction; and a first said stop portion is formed by said first hinge end portion and a second said stop portion is formed between the second hinge end portions.

14. A hinge as claimed in claim 13 wherein at least two of said first hinge end portions comprise respective said first stop portions which abut against a plurality of said second stop portions between second hinge end portions.

15. A hinge as claimed in claim 12, wherein the first said stop portion comprises a hook and the second stop portion comprises a bar extending between second profile portions.

16. A child support apparatus comprising at least one hinge as claimed in claim 1.

17. A child support apparatus having a hinge comprising:

a first hinge member comprising a first hinge end and a first connecting end extending from said first hinge end and connected to a first longitudinal structural member of the child support apparatus along a first longitudinal axis;

a second hinge member comprising a second hinge end and a second connecting end extending from said second hinge end and connected to a second longitudinal structural member of the child support apparatus along a second longitudinal axis;

a pivot member extending through both said hinge ends transverse to said first and second longitudinal axes and defining a pivot axis disposed in a pivot axis plane;

wherein said hinge members are pivotal about said pivot axis between a first condition in which said first and the second longitudinal axes are non-aligned and disposed to one side of said pivot axis plane and a second condition in which said first and second longitudinal axes are generally aligned and said connecting ends are disposed on opposite sides of said pivot axis plane;

wherein the hinge ends together form a hinge profile in a first dimension in the pivot axis and having an outer perimeter which is continuous sufficient to prevent formation of a finger trap greater than 5 mm in the outer perimeter, the hinge profile being formed by said first hinge end comprising a plurality of first hinge end portions and the second hinge end comprising a plurality of second hinge end portions which are arranged alternately with the first hinge end portions in the first dimension, the profiles in the first dimension of the first and second hinge end portions being disposed in partially lapping relationship when in said first condition and configured such that pivotal movement from said first condition to said second condition increases the amount by which the profiles of said first and second hinge end portions overlap; and at least one first hinge end portion moves within adjacent second hinge end portions and at least one second hinge end portion moves within adjacent first hinge end portions, and the spacing between adjacent first hinge end portions and the spacing between adjacent second hinge end portions is less than 5 mm to prevent formation of a finger trap between said hinge ends in a second dimension of the hinge along the first or second longitudinal axes.

18. A hinge comprising:

a first hinge member comprising a first hinge end and a first connecting end extending from said first hinge end, the first connecting end for connection to a first longitudinal structural member of an infant support apparatus along a first longitudinal axis;

a second hinge member comprising a second hinge end and a second connecting end extending from said second hinge end, the second connecting end for connection to a second longitudinal structural member of said infant support apparatus along a second longitudinal axis;

a pivot member extending through said both hinge ends transverse to said first and second longitudinal axes and defining a pivot axis disposed in a pivot axis plane;

wherein said hinge members are pivotal about said pivot axis between a first condition in which said first and the second longitudinal axes are non-aligned and disposed to one side of said pivot axis plane and a second condition in which said first and second longitudinal axes are generally aligned and said connecting ends are disposed on opposite sides of said pivot axis plane;

wherein the first said hinge end comprises a plurality of first hinge end portions and the second hinge end comprises a plurality of second hinge end portions which are arranged alternately with the first hinge end portions in the transverse direction, the profiles of the first and second hinge end portions being disposed in partially lapping relationship when in said first condition and configured such that pivotal movement from said first condition to said second condition increases the amount by which the profiles of said first and second hinge end portions overlap and at least one first hinge end portion moves within adjacent second hinge end portions and at least one second hinge end portion moves within adjacent first hinge end portions to prevent formation of a finger trap between said hinge ends;

wherein the hinge ends comprise respective stop portions which abut against each other in the first condition to stop pivotal movement in the first pivotal direction; and wherein the profile of the hinge ends have an outer configuration which prevents finger trapping between said stop portions when said hinge members are pivoted in the first pivotal direction from said first condition to the second condition;

wherein the profile of the first said hinge end comprises one of said first hinge end portions located between two second hinge end portions of the profile of the second hinge end such that the first and second hinge end portions are provided alternately in the transverse direction;

a first said stop portion is formed by said first hinge end portion and a second said stop portion is formed between the second hinge end portions; and wherein at least two of said first hinge end portions comprise respective said first stop portions which abut against a plurality of said second stop portions between second hinge end portions.

* * * * *